US010506476B2

(12) United States Patent
Nylander et al.

(10) Patent No.: US 10,506,476 B2
(45) Date of Patent: Dec. 10, 2019

(54) ESTABLISHING AN INTERACTION SESSION ON A BEARER IN A RADIO COMMUNICATION NETWORK

(71) Applicant: TELEFONAKTIEBOLAGET LM ERICSSON (PUBL), Stockholm (SE)

(72) Inventors: Tomas Nylander, Värmdö (SE); Ann-christine Eriksson, Enköping (SE); Jari Vikberg, Järna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 79 days.

(21) Appl. No.: 15/735,479

(22) PCT Filed: Jun. 10, 2015

(86) PCT No.: PCT/SE2015/050665
§ 371 (c)(1),
(2) Date: Dec. 11, 2017

(87) PCT Pub. No.: WO2016/200297
PCT Pub. Date: Dec. 15, 2016

(65) Prior Publication Data
US 2018/0199244 A1 Jul. 12, 2018

(51) Int. Cl.
H04W 36/00 (2009.01)
H04W 76/11 (2018.01)
(Continued)

(52) U.S. Cl.
CPC ... *H04W 36/0027* (2013.01); *H04W 28/0263* (2013.01); *H04W 76/10* (2018.02);
(Continued)

(58) Field of Classification Search
CPC . H04W 36/0027; H04W 76/10; H04W 76/11; H04W 76/15; H04W 76/12; H04W 76/22; H04W 28/0263
See application file for complete search history.

(56) References Cited

U.S. PATENT DOCUMENTS 8,249,594 B2 * 8/2012 Vikberg ............... H04W 48/17
370/331
2004/0008823 A1 * 1/2004 Kindermann ........ H04Q 3/0083
379/1.01
(Continued)

FOREIGN PATENT DOCUMENTS

WO 2015124210 A1 8/2015

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Standard; 3GPP TS 23.401, 3rd Generation Partnership Project (3GPP), Mobile Competence Centre; 650, Route Des Lucioles ; F-06921 Sophia-Antipolis Cedex; France, vol. SA WG2, No. V13.2.0, Mar. 12, 2015.

*Primary Examiner* — Jenee Holland

(57) ABSTRACT

A method for establishing an interaction session on the second communication bearer between an Interaction Gateway (IGW) of a RAN and the service client for controlling the service level communication. The method obtains an initialization message addressed to the RAN by means of default IGW address information on the first bearer, for initiating the interaction session, determines dedicated IGW address information for the interaction session, and initiates sending of a confirmation message comprising the determined dedicated IGW address information to the service client. The method ensures that the interaction session is associated with the second communication bearer used for the service level communication, and obtains an interaction session message addressed to the RAN by means of the determined dedicated IGW address information on the second communication bearer, and further initiates sending a response to the interaction session message, to the service client in the radio device on the second bearer.

14 Claims, 8 Drawing Sheets

(51) Int. Cl.
*H04W 76/12* (2018.01)
*H04W 76/22* (2018.01)
*H04W 76/10* (2018.01)
*H04W 28/02* (2009.01)
*H04W 76/15* (2018.01)

(52) U.S. Cl.
CPC ............ *H04W 76/11* (2018.02); *H04W 76/12* (2018.02); *H04W 76/22* (2018.02); *H04W 76/15* (2018.02)

(56) References Cited

U.S. PATENT DOCUMENTS

| | | | | |
|---|---|---|---|---|
| 2004/0125748 | A1* | 7/2004 | Hurtta | H04L 47/14 370/230 |
| 2007/0058789 | A1* | 3/2007 | Lim | H04L 29/06027 379/88.17 |
| 2007/0147243 | A1* | 6/2007 | He | H04L 45/04 370/230 |
| 2009/0225705 | A1* | 9/2009 | Kwon | H04L 41/5054 370/329 |
| 2010/0226332 | A1* | 9/2010 | Zhou | H04L 12/66 370/329 |
| 2011/0176531 | A1* | 7/2011 | Rune | H04W 76/22 370/338 |
| 2012/0002608 | A1* | 1/2012 | Vesterinen | H04W 8/082 370/328 |
| 2013/0148621 | A1* | 6/2013 | Laitila | H04W 68/00 370/329 |
| 2013/0321557 | A1* | 12/2013 | Nishida | H04W 36/0027 348/14.02 |
| 2013/0321558 | A1* | 12/2013 | Nishida | H04N 7/147 348/14.02 |
| 2014/0003394 | A1 | 1/2014 | Rubin et al. | |
| 2014/0153489 | A1* | 6/2014 | Perras | H04W 60/00 370/328 |
| 2015/0289167 | A1* | 10/2015 | Alex | H04W 28/24 370/329 |
| 2016/0105864 | A1* | 4/2016 | Guo | H04W 74/004 455/435.1 |
| 2016/0219644 | A1* | 7/2016 | Zhao | H04W 76/12 |
| 2018/0139644 | A1* | 5/2018 | Nylander | H04W 28/0268 |
| 2018/0199244 | A1* | 7/2018 | Nylander | H04W 28/0263 |

\* cited by examiner

ESTABLISHING AN INTERACTION SESSION ON A BEARER IN A RADIO COMMUNICATION NETWORK

This application is a national phase of Patent Cooperation Treaty (PCT) patent application No. PCT/SE2015/050665, filed Jun. 10, 2015, the disclosure of which is incorporated herein by reference in its entirety.

TECHNICAL FIELD

The present disclosure relates to methods and devices for establishing a communication session between a radio device and a Radio Access Network (RAN).

BACKGROUND

FIG. 1 is a simplified network illustration. The App x and App y in the User Equipment (UE) communicates with their respective server located on the Internet via the mobile operators Radio Access Network (RAN), Core Network (CN) and service network. To take the Adaptive Bit Rate feature as an example, for this feature the video server has the video encoded in different bitrates, and the UE selects the format based on throughput estimations. End user experience or Quality of Experience (QoE) is a differentiator for mobile operators and internet service providers. Applications are attempting to be adaptive to ensure a good QoE, e.g. by adapting to varying throughput by changing to an encoded format with a suitable bitrate. Currently this is done by trying to estimate the throughput between the server and the application in the UE, e.g. based on measured link bit rate or round trip times (RTT). How frequently the bitrate can be changed varies. A typical interval for adaptive video streaming would be every 2-5 seconds.

FIG. 2 is a schematic diagram of Evolved Packet Core (EPC) architecture (non-roaming) for access to a cellular network in accordance with a Third Generation Partnership Project (3GPP) standard. Evolved Packet System (EPS) is the Evolved 3GPP Packet Switched Domain and consists of EPC and an Evolved Universal Terrestrial Radio Access Network (E-UTRAN). The architecture is defined in 3GPP Technical Specification (TS) 23.401, which also defines the Packet Data Network (PDN) Gateway PGW, the Serving Gateway (SGW), the Policy and Charging Rules Function (PCRF), the Mobility Management Entity (MME) and the user equipment (UE, a radio device e.g. a mobile phone). The Long Term Evolution (LTE) radio access network, E-UTRAN, comprises one or more base stations called evolved Node B (eNB).

The overall E-UTRAN architecture and is further defined in for example 3GPP TS 36.300. The E-UTRAN comprises eNBs providing the E-UTRAN user plane (radio interface user plane layers such as Packet Data Convergence Protocol (PDCP), Radio Link Control (RLC), Media Access Control (MAC) and physical layer (PHY)) and control plane (Radio Resource Control, RRC, in addition to the above user plane protocol layers) protocol terminations towards the UE. The eNBs are interconnected with each other over the X2 interface. The eNBs are also connected by means of the S1 interface to the EPC, more specifically to the MME over the S1-MME interface and to the SGW over the S1-U interface.

A new RAN feature has been specified in 3GPP for LTE in Release 12 (Rel-12). It is called LTE Dual Connectivity (DC). As the name implies it means that a UE can be connected to multiple eNBs at the same time, i.e. send and receive data on multiple paths as illustrated in FIG. 3 (showing two different options for user plane handling of LTE DC). E-UTRAN supports DC operation whereby a UE comprising multiple receivers and transmitters (RX/TX) in RRC_CONNECTED state is configured to utilise radio resources provided by two distinct schedulers, located in two different eNBs connected via a non-ideal backhaul over the X2 interface.

In the DC solution, concepts of Master eNB (MeNB) and Secondary eNB (SeNB) are introduced. eNBs involved in dual connectivity for a certain UE may assume two different roles: an eNB may either act as an MeNB or as an SeNB. In dual connectivity, a UE is connected to one MeNB and one SeNB.

In DC, the radio protocol architecture that a particular bearer uses depends on how the bearer is setup. Three alternatives exist, Master Cell Group (MCG) bearer, Secondary Cell Group (SCG) bearer and split bearer.

For MCG bearers, the MeNB is user plane connected to the SGW via S1-U, the SeNB is not involved in the transport of user plane data.

For split bearers, the MeNB is user plane connected to the SGW via S1-U and in addition the MeNB and the SeNB are interconnected via X2. This is shown as the right hand side option of FIG. 3.

For SCG bearers, the SeNB is directly connected with the SGW via S1-U. This is shown as the left hand side option in FIG. 3.

In 3GPP, Quality of Service (QoS) is managed on a per bearer level from the CN. The RAN is responsible for setting up the radio bearers, radio resource management, and enforcing QoS according to the bearer QoS Profile—over the radio (e.g. LTE-Uu) interface in the downlink (DL) and over the transport network in the uplink (UL). The architectures differ slightly over the different radio access networks (e.g. 3G/Wideband Code Division Multiple Access (WCDMA) and 4G/LTE) but the QoS principles are similar (at least for 3G and 4G networks). FIG. 4 shows the EPS bearer architecture and the different levels of bearers building up the end-to-end connection for the UE.

3GPP defines the concept of a PDN. A PDN is in most cases an IP network, e.g. Internet or an operator IP Multimedia Subsystem (IMS) service network. A PDN has one or more names. Each name is defined in a string called Access Point Name (APN). The PGW is a gateway towards one or more PDNs. A UE may have one or more PDN connections. A PDN connection is a logical IP tunnel between UE and PGW, providing the UE access to a PDN. The setup of a PDN connection is initiated from the UE.

Every PDN connection consists of one or more EPS bearers. See 3GPP TS 23.401 section 4.7.2 for a description of the bearer concept. A bearer uniquely identifies traffic flows that receive a common QoS treatment between a UE and a PGW. Each bearer on a particular access has a unique bearer ID. On the 3GPP access, the bearer is end-to-end between UE and PGW. Every PDN connection has at least one bearer and this bearer is called the default bearer. All additional bearers on the PDN connection are called dedicated bearers.

A bearer carries traffic in the form of IP packets. Which traffic is carried on a bearer is defined by filters. A filter is an n-tuple where each element in the tuple contains a value, a range, or a wildcard. An n-tuple is also known as an IP flow.

An example of a 5-tuple is (dst IP=83.40.20.110, src IP=145.45.68.201, dst port=80, src port=*, prot=TCP). This 5-tuple defines a source (src) and destination (dst) IP address, a source and destination port, and a protocol. The source port is a wildcard. Traffic matching this 5-tuple filter would be all Transmission Control Protocol (TCP) traffic from IP=145.45.68.201 to IP=83.50.20.110 and port=80.

A traffic flow template (TFT) contains one or more filters. Every bearer has a TFT. One bearer within a PDN connection and access may lack an explicit TFT (this bearer is typically the default bearer). Implicitly such a bearer has a TFT with a single filter matching all packets.

Bearers are used for example to provide different quality of service and characteristics. When a UE is active it has a default bearer where all traffic goes. The network or the UE can initiate a secondary/dedicated bearer with a different quality/characteristics. The network can detect a flow that should have a dedicated bearer by inspecting the traffic, or the network can be informed by an Application Function (AF), with reference to FIG. 2, an entity in the operators IP services, or the network can be informed by the UE about the need for a dedicated bearer. For example, if a video session is detected. The network then could trigger the establishment of a new bearer, apply a filter to separate which traffic should go on which bearer, i.e. the TFT. This TFT is also sent to the UE so that the UE can put UL traffic on the correct bearer. In DL, TFTs are used to map/select which transport tunnel (GTP tunnel) and bearer a certain flow should be sent on. A TFT can comprise the following identifiers:

Source Address and Subnet Mask
Protocol Number (IPv4)/Next Header (IPv6)
Destination Port Range
Source Port Range
IPsec SPI
TOS (IPv4)/Traffic Class (IPv6) and Mask
Flow Label (IPv6)

For example, the PGW will, when receiving an IP packet from Internet with destination IP address, select a UE context based on the destination IP address. This means that the UE context is identified with an UE IP address and contains a number of TFTs associated for each dedicated bearer established for the UE. The PGW then checks if there is a TFT associated with information included in the received IP packet in the UE context and try to match the received IP packet with the TFT, and if there is a match send the packet on the dedicated bearer associated with that TFT. Similarly for the UE, when an UL packet is sent from the higher layer parts of the UE, e.g. an app, and received by the lower layer of the UE, e.g. where the radio protocols reside, there is a check if there is a TFT that matches and if there is match then the UL packet is sent on the dedicated bearer associated with that TFT.

SUMMARY

The present disclosure is related to providing new functionality in existing (2G, 3G, 4G etc.) and future RAN (5G, 6G, etc.). The area of functionality comprises interactions between the service domain and RAN domain, for example between an app running on a radio device and a RAN node such as an eNB.

Service applications are attempting to be adaptive to ensure a good QoE, e.g. by adapting to varying throughputs by changing the bit rate or resolution of a streaming video and/or audio to avoid freezing of the play-out. Currently, this is done by trying to estimate the throughput between server and application in the radio device, e.g. based on measured link bit rate or round trip times (RTT). The estimation is typically performed by the application in the radio device, i.e. the service client (herein also called "client"). An interface between the mobile network and the client could be used to convey information that can be used to enhance service delivery and QoE.

It would be convenient to provide interaction between the service client in the radio device and the RAN based on user plane communication. However, if dedicated bearers are used to deliver the service in question, the interaction communication should preferably be possible to relate to the dedicated bearer of the service, since for example the achievable bitrate may depend on the priority of the bearer.

It may be possible to improve the throughput estimations by having network (NW) interaction with the clients, e.g. in accordance with the architecture illustrated in FIG. 5. A new functionality called an Interaction Gateway (IGW) is introduced in the network side for the communication towards (different parts of) a connected radio device. An I1-interface is introduced between the radio device and the Interaction Gateway. In addition, the Interaction Gateway may have another interface, called an I2-interface, towards the RAN depending on the position of the Interaction Gateway. The Interaction Gateway can be placed either in the RAN (see FIG. 5) or at the SGi interface. In the following, it is assumed that the IGW is in the RAN.

The I1-interface may be defined based on user plane traffic. It may for example be User Datagram Protocol (UDP)/Internet Protocol (IP)-based so that the client (app) in the radio device is able to send and receive interaction messages. The intention is that a single IP address may be used by the RAN nodes in one operators network for the interaction. This may simplify Operations and Maintenance (O&M) and RAN handling. The presence of this IP address (called RAN IP address, which may be part of default IGW address information) may thus be an indication of an interaction session message for the RAN. The client in the radio device can for example obtain this IP address by a Domain Name System (DNS) lookup. Additional measures may be needed since RAN does not normally terminate user plane traffic. Therefore, the RAN may perform "sniffing" of the uplink (UL) traffic to detect if a message is an interaction message or not (i.e. if the destination IP address=RAN IP address). When an interaction message is identified, it may only be forwarded to the Interaction Gateway (i.e. not towards the core network). When the Interaction Gateway in RAN wants to send an interaction message to the radio device, it is injected in the downlink traffic by the RAN. For the use case network assistance (which aims to improve QoE), the client in the radio device sends a query message to the RAN node asking for the available bitrate. This query is handled by the Interaction Gateway which interacts with a Function for Recommendation, wherein an achievable bit rate is estimated or predicted for the radio device. Then, a response message may be sent back to the radio device. The achievable bitrate may depend on a number of factors, e.g. number of radio devices in the cell that needs to share the capacity, the radio conditions of the radio device, and the priority for the bearer.

The user plane based interaction interface (I1) may have some issues if dedicated bearers are used and the UE-NW interactions are related to the session on the dedicated bearer. These issues are hereby exemplified:

a In the case of a radio device having both a default bearer and a dedicated bearer involving one RAN node, then when an I1 query message is sent from the upper layer in the radio device, that query will be sent on the default bearer since the default bearer carries all IP-flows with no specific TFT filtering. The receiving RAN node cannot determine which bearer this query relates to and the subsequent bitrate recommendation will be done for the default bearer. If the query was related to the dedicated bearer, the recommendation will be incorrect.

b In the case of Dual Connectivity, then an I1 query message sent by the radio device on the default bearer may result in that the query message even ends up in the wrong RAN node, e.g. if MCG bearer carries the default bearer, and SCG bearer carries the dedicated bearer.

c Also, if I1 messages are sent on another bearer than the service they are related to, different priorities apply whereby there is a risk that for example I1 messages get a higher latency.

d In case there are several bearers with services that requires I1 interaction, for example if two applications in the radio device wants to use I1 interaction for adaptive video, and they are on different bearers, then, the I1 interaction have to take place on the correct bearer.

Therefore it would be advantageous if the I1 interaction messages are sent on the same bearer that the interaction relates to, as in accordance with the present disclosure.

This is achieved by an initial radio device—RAN interaction on the default bearer. During this initial interaction, the RAN selects dedicated IGW address information, e.g. a termination port, for this I1 interaction session and replies with that to the radio device. If a second I1 interaction session is initiated by the radio device, it is sent on the default bearer and when the RAN detects the new I1 initiation it selects a second dedicated IGW address information, e.g. termination port for the second I1 session. Then, either the NW or the radio device may ensure that the I1 signaling is directed to the same bearer as the service it relates to.

If the NW should ensure that the I1 signaling of the interaction session is directed to the same bearer as the service it relates to, the radio device, by means of the service client, during the initial interaction may also inform the RAN about service level address information e.g. destination addresses used by the service. The RAN may then communicate the received information about the service level address information, the used default IGW address information and the determined dedicated IGW address information for service client-RAN interaction to an Application Function (AF) that can communicate with the PCRF (Alternatively the RAN could act as an AF and implement the Rx interface). The AF may then instruct the PCRF via the Rx interface to ensure that a filter (exemplified as a TFT) is added for the dedicated IGW address information for the bearer associated with the service and identified with the destination addresses used by the service (i.e. there exists a TFT for at least parts of the destination addresses used by the service for the bearer associated with the service). The PCRF ensures this by signaling the received information to the PGW (over the Gx interface). The PGW may then initiate a bearer modification procedure resulting in that the radio device also receives the updated UL TFT for the dedicated IGW address information for the bearer associated with the service.

If the radio device should ensure that the I1 signaling is directed to the same bearer as the service it relates to, it may, when receiving the dedicated IGW address information that should be used, initiate a procedure for radio device requested bearer resource modification towards the CN, indicating that a TFT for the dedicated IGW address information should be added for the dedicated bearer in question. This procedure, if accepted and supported by the NW, may lead to that the CN sends information about the added TFT also to the radio device as per normal procedures. This option may require that the service client (app) in the radio device has an internal Application Programming Interface (API) to activate this functionality, i.e. that the client is bearer aware and has requested a dedicated bearer initially. Alternatively, the radio device could have an API to add this filter locally, e.g., when receiving the dedicated IGW address information from the RAN, the client could instruct the lower layers of the radio device to install the TFT filter with the dedicated IGW address information for the bearer.

According to an aspect of the present disclosure, there is provided a method performed in a RAN of a communication network used by a service client for service level communication with a service provider, in which communication network there is a first and a second communication bearer between a radio device, comprising the service client, and a core network (CN) of the communication network via the RAN. The second communication bearer is associated with the service level communication. The method is for establishing an interaction session on the second communication bearer between an Interaction Gateway (IGW) of the RAN and the service client for controlling the service level communication. The method comprises obtaining an initialization message addressed to the RAN by means of default IGW address information on the first bearer, for initiating the interaction session, the initialization message comprising service level address information used for the service level communication on the service provider side. The method also comprises determining dedicated IGW address information for the interaction session. The method also comprises initiating sending of a confirmation message comprising the determined dedicated IGW address information to the service client. The method also comprises ensuring that the interaction session, using the dedicated IGW address information, is associated with the second communication bearer used for the service level communication. The method also comprises obtaining an interaction session message addressed to the RAN by means of the determined dedicated IGW address information on the second communication bearer. The method also comprises initiating sending a response to the interaction session message, to the service client in the radio device on the second bearer.

According to another aspect of the present disclosure, there is provided a RAN node for a RAN of a communication network used by a service client for service level communication with a service provider, in which communication network there is a first and a second communication bearer between a radio device and a CN of the communication network via the RAN. The second communication bearer is associated with the service level communication. The RAN node is suitable for establishing an interaction session between an IGW and the service client on the second communication bearer for controlling the service level communication. The RAN node comprises the IGW, processor circuitry, and a storage unit storing instructions executable by said processor circuitry whereby said RAN node is operative to obtain an initialization message addressed to the RAN by means of default IGW address information on the first bearer, for initiating the interaction session, the initialization message comprising service level address information used for the service level communication on the service provider side. The RAN node is also operative to determine dedicated IGW address information for the interaction session. The RAN node is also operative to initiate sending of a confirmation message comprising the determined dedicated IGW address information to the service client. The RAN node is also operative to ensure that the interaction session, using the dedicated IGW address information, is associated with the second communication bearer used for the service level communication. The RAN node is also operative to obtain an interaction session message addressed to the RAN by means of the determined dedicated IGW address information on the second communication bearer. The RAN node is also operative to initiate sending a response to the interaction session message, to the service client in the radio device on the second bearer.

According to another aspect of the present disclosure, there is provided a method performed in a radio device, the radio device comprising a service client configured for service level communication with a service provider. The radio device being connected to a RAN of a communication network in which there is a first and a second communication bearer between the radio device and a CN of the communication network via the RAN. The second communication bearer is associated with the service level communication. The method is for establishing an interaction session between an IGW of the RAN and the service client in the radio device on the second communication bearer for controlling the service level communication. The method comprises obtaining dedicated IGW address information for the interaction session. The method also comprises ensuring that the interaction session, using the dedicated IGW address information, is associated with the second communication bearer used for the service level communication.

According to another aspect of the present disclosure, there is provided a radio device suitable for being connected to a RAN of a communication network in which there is a first and a second communication bearer between the radio device and a CN of the communication network via the RAN, where the second communication bearer is associated with the service level communication, and suitable for establishing an interaction session between an IGW of the RAN and the service client in the radio device on the second communication bearer for controlling the service level communication. The radio device comprises a service client configured for service level communication with a service provider, processor circuitry, and a storage unit storing instructions executable by said processor circuitry whereby said radio device is operative to obtain dedicated IGW address information for the interaction session. The radio device is also operative to ensure that the interaction session, using the dedicated IGW address information, is associated with the second communication bearer used for the service level communication.

According to another aspect of the present disclosure, there is provided a computer program product comprising computer-executable components for causing a RAN node to perform an embodiment of a method of the present disclosure when the computer-executable components are run on processor circuitry comprised in the RAN node.

According to another aspect of the present disclosure, there is provided a computer program product comprising computer-executable components for causing a radio device to perform an embodiment of a method of the present disclosure when the computer-executable components are run on processor circuitry comprised in the radio device.

According to another aspect of the present disclosure, there is provided a computer program for establishing an interaction session between an IGW of a RAN and a service client of a radio device for controlling service level communication between the service client and a service provider, wherein there is a first and a second communication bearer between the radio device and a CN via the RAN, where the second communication bearer is associated with the service level communication. The computer program comprises computer program code which is able to, when run on processor circuitry of a RAN node, cause the RAN node to obtain an initialization message addressed to the RAN by means of default IGW address information on the first bearer, for initiating the interaction session, the initialization message comprising service level address information used for the service level communication on the service provider side. The code is also able to cause the RAN node to determine dedicated IGW address information for the interaction session. The code is also able to cause the RAN node to initiate sending of a confirmation message comprising the determined dedicated IGW address information to the service client. The code is also able to cause the RAN node to ensure that the interaction session, using the dedicated IGW address information, is associated with the second communication bearer used for the service level communication. The code is also able to cause the RAN node to obtain an interaction session message addressed to the RAN by means of the determined dedicated IGW address information and associated with the service level communication, on the second communication bearer. The code is also able to cause the RAN node to initiate sending a response to the interaction session message, to the service client in the radio device on the second bearer.

According to another aspect of the present disclosure, there is provided a computer program for establishing an interaction session between an IGW of a RAN and service client of a radio device for controlling service level communication between the service client and a service provider, wherein there is a first and a second communication bearer between the radio device and a CN via the RAN, where the second communication bearer is associated with the service level communication. The computer program comprises computer program code which is able to, when run on processor circuitry of the radio device, cause the radio device to obtain dedicated IGW address information for the interaction session. The code is also able to cause the radio device to ensure that the interaction session, using the dedicated IGW address information, is associated with the second communication bearer used for the service level communication.

According to another aspect of the present disclosure, there is provided a computer program product comprising an embodiment of a computer program of the present disclosure and a computer readable means on which the computer program is stored.

Since the interaction session is for controlling the service level communication on the second bearer, e.g. a dedicated bearer dedicated to the service of the service provider, it would be advantageous to have also the interaction session on the second bearer rather than on the first bearer. Otherwise, the RAN may have difficulties determining what service level communication the interaction session relates to, since the RAN may not know which bearer is for which service (the RAN usually only forwarding data on the different bearers). By means of the dedicated IGW address information, the RAN knows which data on the second bearer is part of the interaction session and that it relates to the service level communication.

The present disclosure provides methods to ensure that the interaction session over the I1 interface is on the same bearer as the related service is running on.

This is achieved by an initial Client—RAN interaction on the first (e.g. default) bearer. During this initial interaction, the RAN selects the dedicated IGW address information (e.g. a termination port for) this I1 session and replies with that to the radio device. If a second I1 interaction session is initiated by the client, it is again sent on the first bearer and when RAN detects a new I1 initiation it selects a second dedicated IGW address information (e.g. termination port and/or an IP address to the RAN allowing the RAN to identify data addressed to it which should not be forwarded on the bearer) for the second I1 interaction session. Then either the network or the radio device can ensure that the signaling of the interaction session over I1 is directed to the same bearer as the service it relates to.

1. If the NW should ensure this, the radio device during the initial interaction may also inform the RAN about service level address information (e.g. destination addresses used by the service). The RAN may then communicate the received service level address information and the determined dedicated IGW address information for Client-RAN interaction, and possibly the RAN address to an Application Function (AF) that can communicate with the PCRF (Alternatively the RAN could act as an AF and implement the Rx interface). The AF may then instruct the PCRF via the Rx interface to ensure that a filter (exemplified as a TFT) is added for the dedicated IGW address information for the bearer associated with the service and identified with the destination addresses used by the service (i.e. there exists a TFT for at least parts of the destination addresses used by the service for the bearer associated with the service). The PCRF ensures this by signaling the received information to the PGW (over the Gx interface). The PGW may then initiate a bearer modification procedure resulting in that the radio device also receives the updated UL TFT for the dedicated IGW address information for the bearer associated with the service.

2. If the radio device should ensure this, it may when receiving the dedicated IGW address information that should be used, initiate a procedure Requested Bearer Resource Modification (in accordance with 3GPP TS 23.401) towards the mobile core indicating that a filter (e.g. TFT) for the dedicated IGW address information should be added for the second bearer in question. This procedure, if accepted and supported by the mobile NW, will lead to that the mobile core network sends information about the added filter also to the radio device as per standard procedures. This option may require that the client in the radio device has an internal API to activate this functionality, i.e. that the client is bearer aware and has requested a dedicated bearer initially. Alternatively, the UE could have an API to add this filter (e.g. TFT) locally, i.e. when receiving the determined dedicated IGW address information from the RAN, the client could instruct the lower layers of the radio device to install the TFT/filter with the dedicated IGW address information for the bearer.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Figure 1:
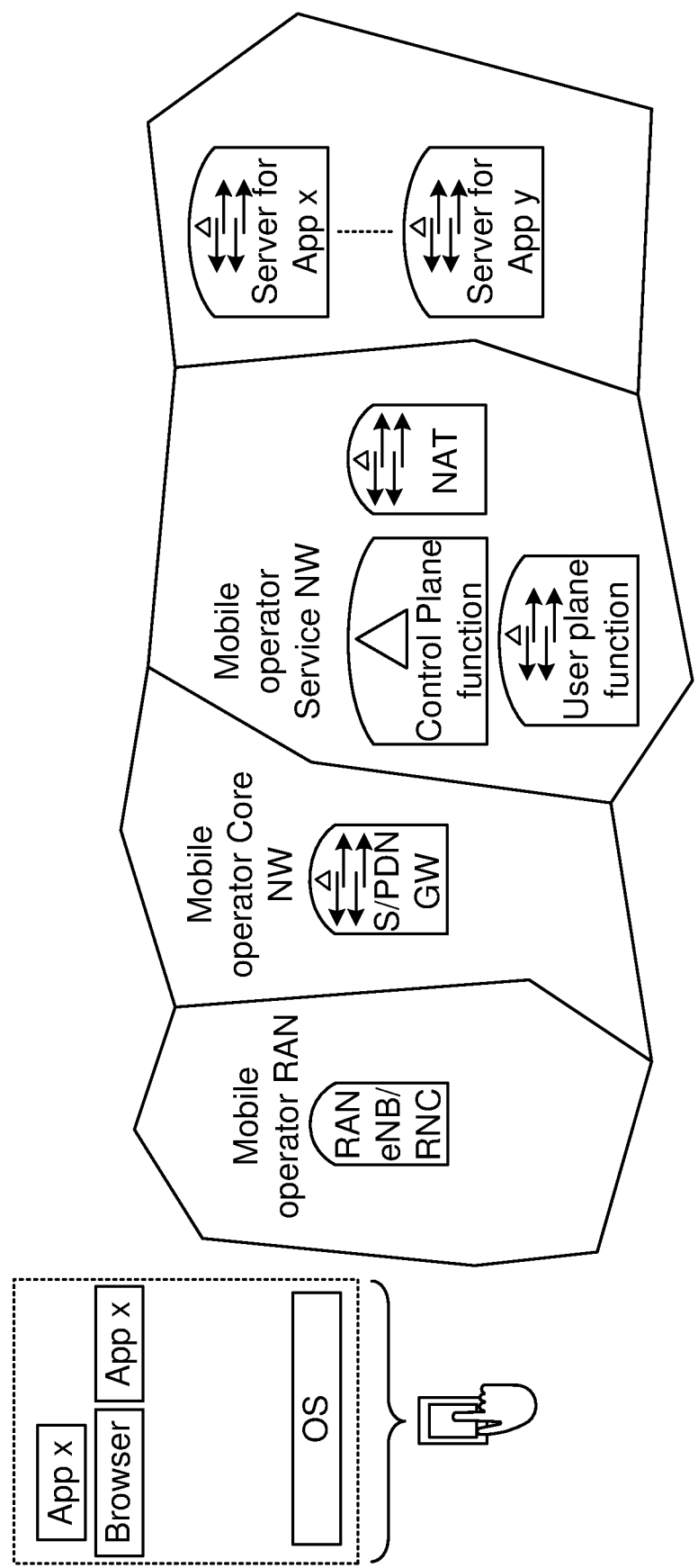
FIG. 1 is a schematic overview of a standard 3GPP communication network.
Figure 2:
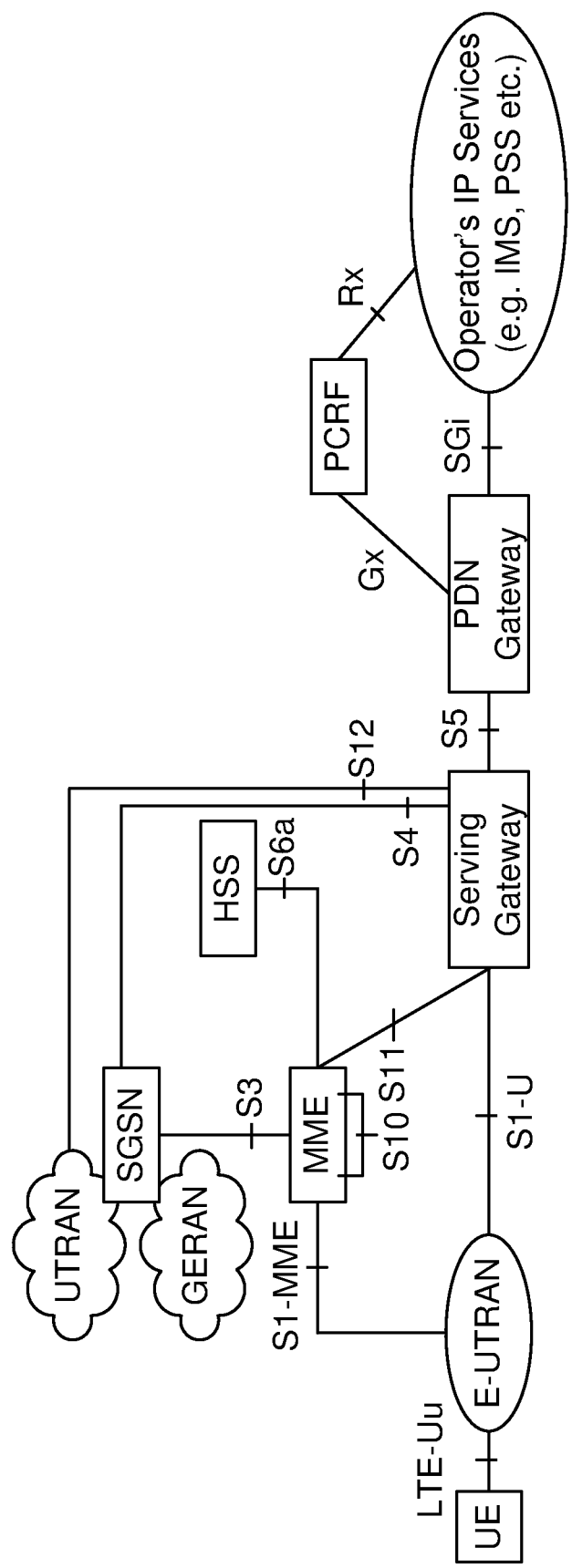
FIG. 2 is another, more detailed, schematic block diagram overview of a standard 3GPP communication network.
Figure 3:
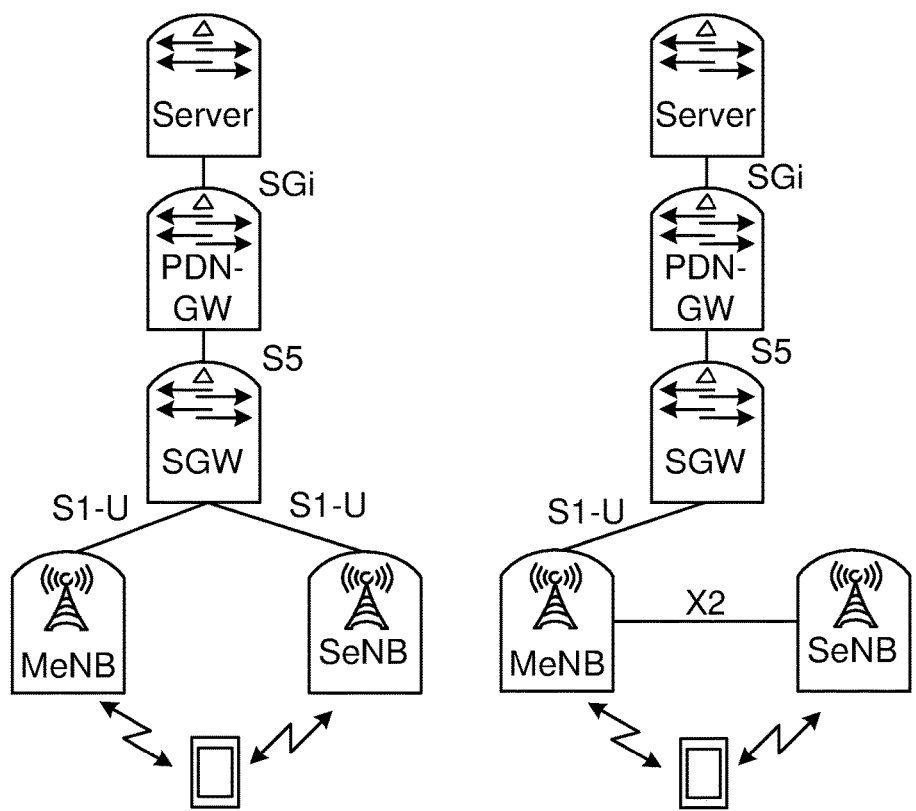
FIG. 3 is a schematic block diagram illustrating two different options for dual connectivity in accordance with LTE standard.
Figure 4:
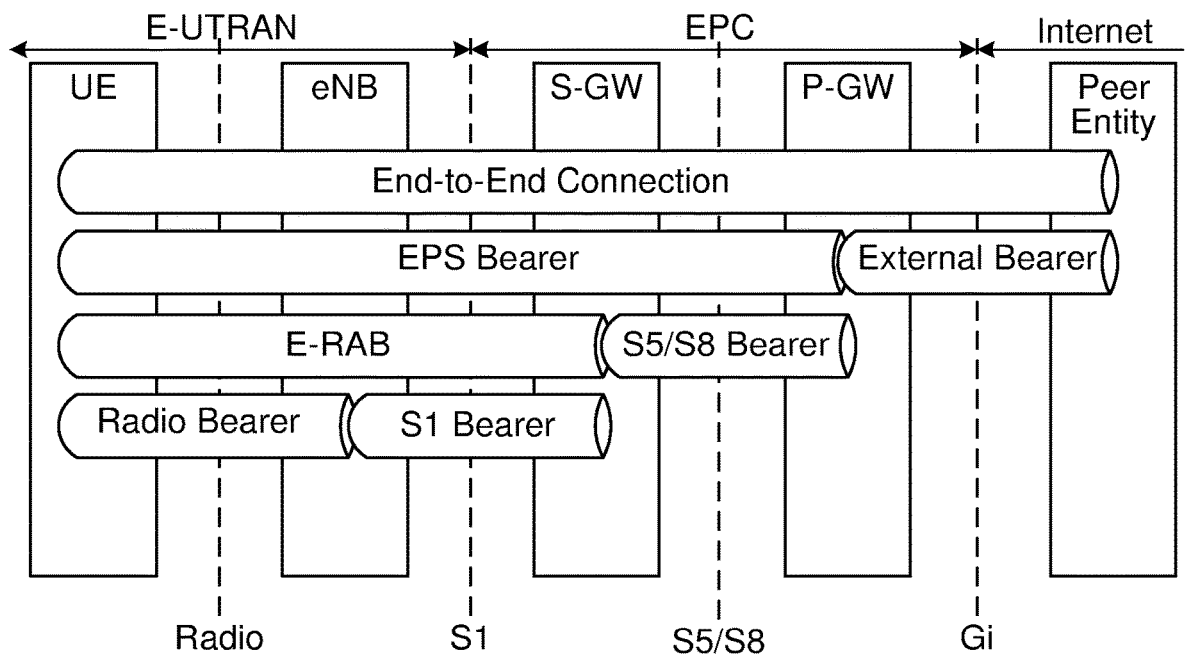
FIG. 4 is a schematic diagram illustrating the different bearer types in accordance with EPC.
Figure 5:
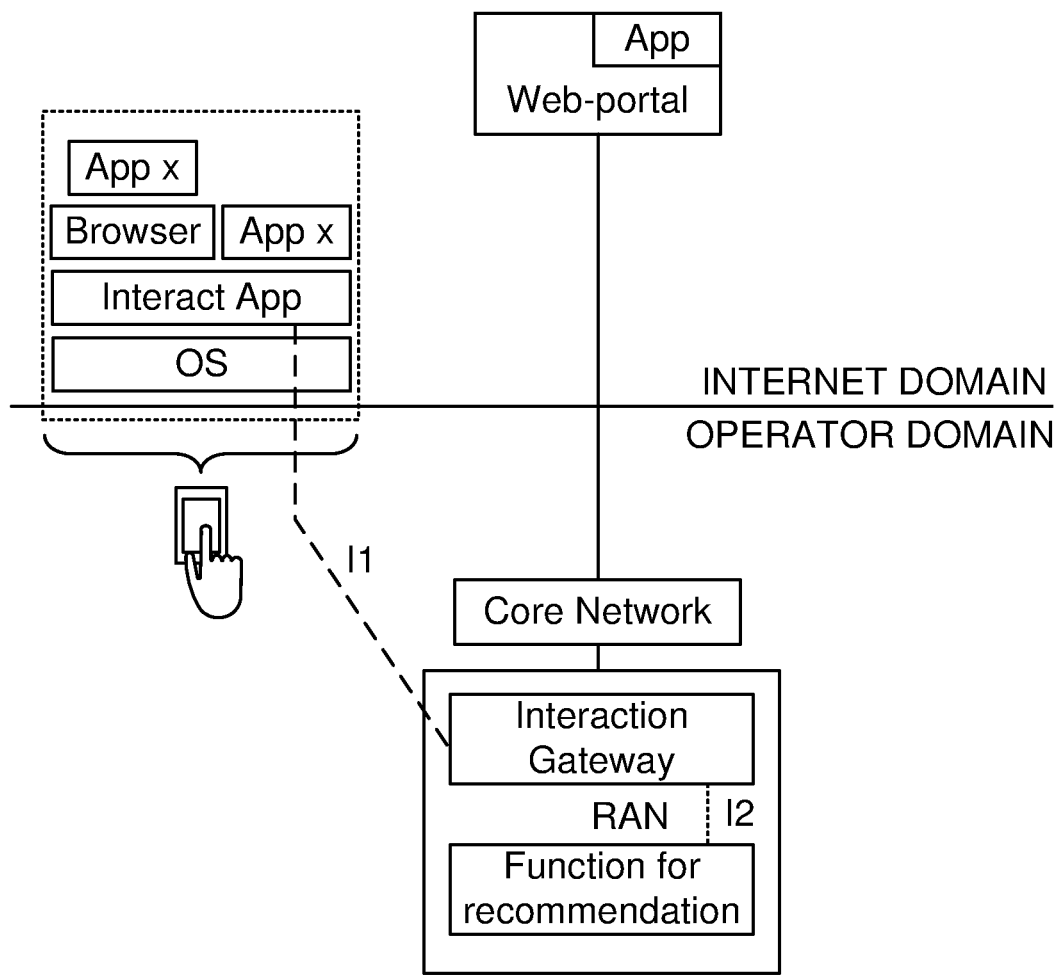
FIG. 5 is a schematic block diagram illustrating a positioning of an IGW as well as interfaces I1 and I2 to said IGW, in accordance with the present disclosure.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

This present disclosure provides methods to relate client-RAN interaction, I1 interaction, to the corresponding bearer that carries the service which the interaction relates to, and by that making it possible for the RAN to make recommendations for a specific bearer, i.e. service. Additionally, the methods allow the RAN to make multiple I1 recommendations, one per each bearer.

Embodiments of the present disclosure provides methods to facilitate that interaction messages will be sent on the dedicated bearer the interaction relates to. This may be done by ensuring that a filter/TFT including the dedicated IGW address information (e.g. RAN IP address and/or termination port) is used to identify interaction messages sent to the radio device on the dedicated bearer the interaction relates to.

The general assumption in the following description of example embodiments is that there exists a default bearer and at least one dedicated bearer for the radio device. The dedicated bearer is used for a specific service for which the radio device is about to establish the interaction session over I1. Some embodiments may also function in the case when the radio device has multiple dedicated bearers for different services and a separate I1 interaction session is to be established for each service.

When a dedicated bearer is established and the client wishes to interact over I1, the client may send an I1 Initialization Message on the default bearer addressed to the RAN by means of default IGW address information. The default IGW address information may comprise an IP address or an UDP port, or both. The IP address may be a so called RAN IP address. When the client in the radio device sends this message, the lower layers in the radio device typically sends this message on the default bearer since the destination IP (the RAN IP) is not part of any TFT for a dedicated bearer. The RAN when receiving this message may select an UDP port as dedicated IGW address information, and return this to the client with an I1 Confirmation Message, if service interaction supported and accepted.

A further step may then be to add a TFT for the dedicated IGW address information (e.g. RAN IP and/or selected termination (UDP) port), so that the bearer handling in the radio device will send uplink packets with dedicated IGW address information to the correct dedicated bearer, i.e. the bearer for the related service. Either the network or the radio device may initiative the addition of a TFT.

Figure 6:
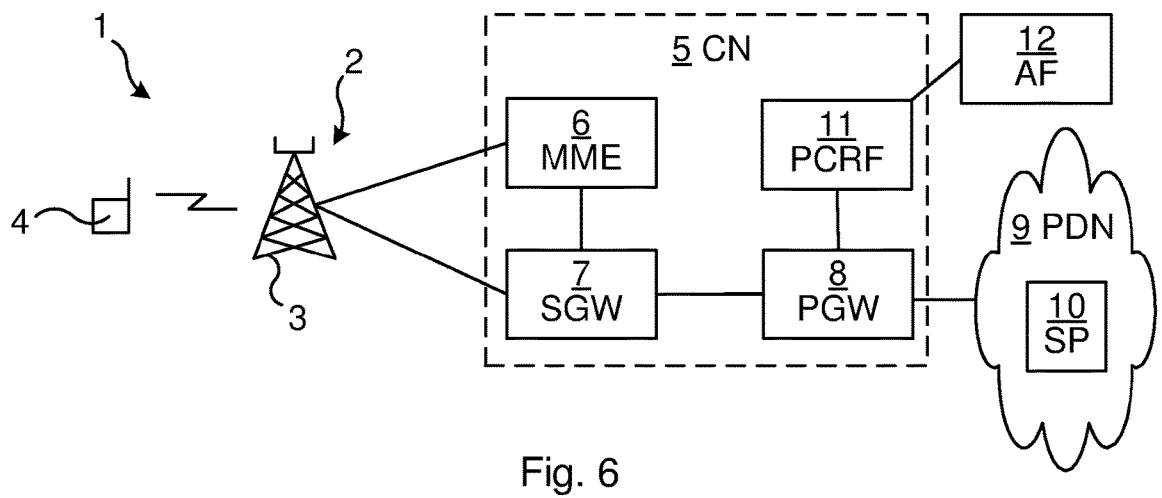
FIG. 6 is a schematic block diagram of an embodiment of a communication network in accordance with the present disclosure.

FIG. 6 is a schematic block diagram of a radio device 4 connected to a communication network 1. The communication network 1 comprises a RAN 2, typically a cellular RAN in accordance with a 3GPP standard, comprising one or a plurality of RAN nodes 3, e.g. evolved Node B (eNB) or Node B in combination with Radio Network Controller (RNC). The communication network 1 also comprises a CN 5 comprising an SGW 7 and a PGW 8 as well as an MME 6 and a PCRF 11, and any other standard CN nodes needed. The PCRF is also connected with an AF 12 in accordance with some embodiments of the present disclosure. Via the PGW, the communication network is connected to the PDN 9, e.g. the Internet, in which a service provider (SP) 10 resides with one or a plurality of servers e.g. Content Delivery Network (CDN) servers.

The radio device 4 may be any device or user equipment (UE), mobile or stationary, enabled to communicate over a radio channel in a communication network 1, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

Figure 7A:
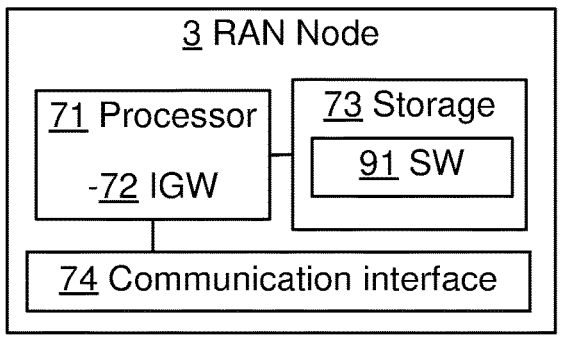
FIG. 7a is a schematic block diagram of an embodiment of a RAN node in accordance with the present disclosure.

FIG. 7a schematically illustrates an embodiment of a RAN node 3 of the present disclosure. The RAN node 3 comprises processor circuitry 71 e.g. a central processing unit (CPU). The processor circuitry 71 may comprise one or a plurality of processing units in the form of microprocessor(s). However, other suitable devices with computing capabilities could be comprised in the processor circuitry 71, e.g. an application specific integrated circuit (ASIC), a field programmable gate array (FPGA) or a complex programmable logic device (CPLD). The processor circuitry 71 is configured to run one or several computer program(s) or software (SW) 91 (see also FIG. 9) stored in a storage 73 of one or several storage unit(s) e.g. a memory. Thus, the interaction gateway (IGW) may be formed in the processor circuitry 71 by SW 91 stored in the storage 73 running on the processor circuitry 71. The storage unit is regarded as a computer readable means 93 (see FIG. 9) as discussed herein and may e.g. be in the form of a Random Access Memory (RAM), a Flash memory or other solid state memory, or a hard disk, or be a combination thereof. The processor circuitry 71 may also be configured to store data in the storage 73, as needed. The RAN node 3 also comprises a communication interface 74 for communication with other nodes in the communication network 1 as well as with the radio device over a radio interface. The communication interface comprises a transmitter and a receiver, which may be combined into a transceiver, as well as an antenna for radio communication.

According to an embodiment of the present disclosure, there is provided a RAN node 3 for a RAN 2 of a communication network 1 used by a service client 82 (see FIG. 8a) for service level communication with a service provider 10, in which communication network there is a first and a second communication bearer between a radio device 4 and a CN 5 of the communication network via the RAN, where the second communication bearer is associated with the service level communication, for establishing an interaction session between an IGW 72 and the service client on the second communication bearer for controlling the service level communication. The RAN node comprises the IGW 72, processor circuitry 71, and a storage unit 73 storing instructions 91 executable by said processor circuitry whereby said RAN node is operative to obtain an initialization message addressed to the RAN 2 by means of default IGW address information on the first bearer, for initiating the interaction session, the initialization message comprising service level address information used for the service level communication on the service provider side. The RAN node is also operative to determine dedicated IGW address information for the interaction session. The RAN node is also operative to initiate sending of a confirmation message comprising the determined dedicated IGW address information to the service client 82. The RAN node is also operative to ensure that the interaction session, using the dedicated IGW address information, is associated with the second communication bearer used for the service level communication. The RAN node is also operative to obtain an interaction session message addressed to the RAN 2 by means of the determined dedicated IGW address information on the second communication bearer. The RAN node is also operative to initiate sending a response to the interaction session message, to the service client 82 in the radio device 4 on the second bearer.

Figure 7B:
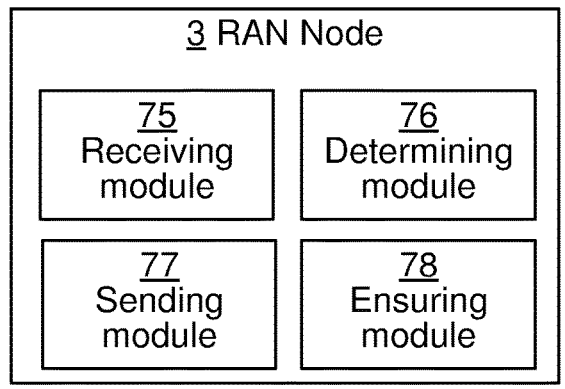
FIG. 7b is a schematic block diagram of another embodiment of a RAN node in accordance with the present disclosure.

FIG. 7b is a schematic block diagram functionally illustrating an embodiment of the RAN node 3 in FIG. 7a. As previously mentioned, the processor circuitry 71 may run software 91 for enabling the RAN node 3 to perform an embodiment of a method of the present disclosure, whereby functional modules may be formed in RAN node 3 e.g. in the processor circuitry 71 for performing the different steps of the method. These modules are schematically illustrated as blocks within the RAN node 3. Thus, the RAN node 3 comprises a receiving module 75 for obtaining an initialization message addressed to the RAN 2 by means of default IGW address information on the first bearer, for initiating the interaction session, the initialization message comprising service level address information used for the service level communication on the service provider side; and for obtaining an interaction session message addressed to the RAN 2 by means of the determined dedicated IGW address information on the second communication bearer. The messages may be obtained by e.g. receiving them directly from the radio device 4 or via another RAN node 3. The RAN node 3 also comprises a determining module 76 for determining dedicated IGW address information for the interaction session. The RAN node also comprises a sending module 77 for initiating sending of a confirmation message comprising the determined dedicated IGW address information to the service client, and for initiating sending a response to the interaction session message, to the service client 82 in the radio device 4 on the second bearer. The RAN node also comprises an ensuring module 78 for ensuring that the interaction session, using the dedicated IGW address information, is associated with the second communication bearer used for the service level communication.

Figure 8A:
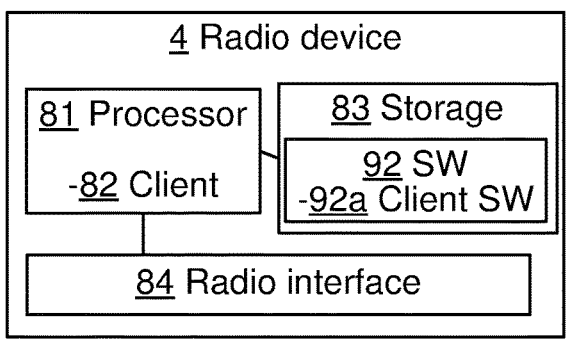
FIG. 8a is a schematic block diagram of an embodiment of a radio device in accordance with the present disclosure.

FIG. 8a schematically illustrates an embodiment of a radio device 4 of the present disclosure. The radio device 4 comprises processor circuitry 81 e.g. a central processing unit (CPU). The processor circuitry 81 may comprise one or a plurality of processing units in the form of microprocessor(s). However, other suitable devices with computing capabilities could be comprised in the processor circuitry 81, e.g. an application specific integrated circuit (ASIC), a field programmable gate array (FPGA) or a complex programmable logic device (CPLD). The processor circuitry 81 is configured to run one or several computer program(s) or software (SW) 92 (see also FIG. 9) stored in a storage 83 of one or several storage unit(s) e.g. a memory. Thus, the service client 82 (e.g. a service application, an app) may be formed in the processor circuitry 71 by client SW 92a stored in the storage 83 running on the processor circuitry 81. The storage unit is regarded as a computer readable means 93 (see FIG. 9) as discussed herein and may e.g. be in the form of a Random Access Memory (RAM), a Flash memory or other solid state memory, or a hard disk, or be a combination thereof. The processor circuitry 81 may also be configured to store data in the storage 83, as needed. The radio device 4 also comprises a radio communication interface 84 for communication with/via the communication network 1 e.g. via the RAN node 3. The radio interface comprises a transmitter and a receiver, which may be combined into a transceiver, as well as an antenna for radio communication.

According to an aspect of the present disclosure, there is provided a radio device 4 for being connected to a RAN 2 of a communication network 1 in which there is a first and a second communication bearer between the radio device and a CN 5 of the communication network via the RAN, where the second communication bearer is associated with the service level communication, and for establishing an interaction session between an IGW 72 of the RAN and the service client in the radio device on the second communication bearer for controlling the service level communication. The radio device comprises a service client 82 configured for service level communication with a service provider, processor circuitry 81, and a storage unit 83 storing instructions 92 executable by said processor circuitry whereby said radio device is operative to obtain dedicated IGW address information for the interaction session. The radio device is also operative to ensure that the interaction session, using the dedicated IGW address information, is associated with the second communication bearer used for the service level communication.

Figure 8B:
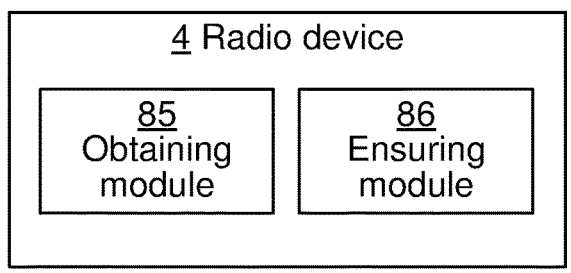
FIG. 8b is a schematic block diagram of another embodiment of a radio device in accordance with the present disclosure.

FIG. 8b is a schematic block diagram functionally illustrating an embodiment of the radio device 4 in FIG. 8a. As previously mentioned, the processor circuitry 81 may run software 92 for enabling the radio device 4 to perform an embodiment of a method of the present disclosure, whereby functional modules may be formed in the radio device 4 e.g. in the processor circuitry 81 for performing the different steps of the method. These modules are schematically illustrated as blocks within the radio device 4. Thus, the radio device 4 comprises an obtaining module 85 for obtaining dedicated IGW address information for the interaction session, and an ensuring module 86 for ensuring that the interaction session, which session uses the dedicated IGW address information, is associated with the second communication bearer used for the service level communication.

Figure 9:
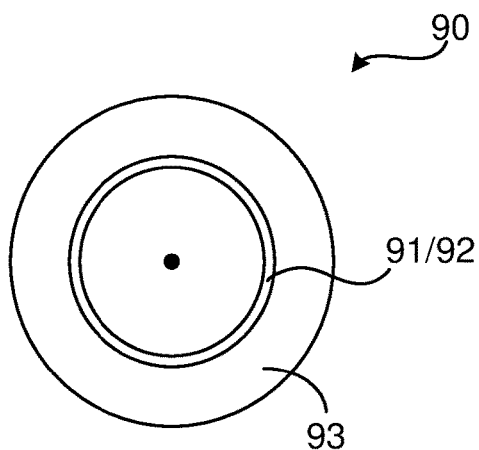
FIG. 9 is a schematic illustration of an embodiment of a computer program product in accordance with the present disclosure.

FIG. 9 illustrates a computer program product 90. The computer program product 90 comprises a computer readable (e.g. non-volatile and/or non-transitory) medium 93 comprising a computer program 91 and/or 92 in the form of computer-executable components 91/92. The computer program/computer-executable components 91/92 may be configured to cause a RAN node 3 or a radio device 4, e.g. as discussed herein, to perform an embodiment of a method of the present disclosure. The computer program/computer-executable components may be run on the processor circuitry 71/81 of the RAN node 3/radio device 4 for causing it to perform the method. The computer program product 90 may e.g. be comprised in a storage unit or memory 73/83 comprised in the RAN node 3/radio device 4 and associated with the processor circuitry 71/81. Alternatively, the computer program product 90 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium 93 can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

According to an aspect of the present disclosure, there is provided a computer program product 90 comprising computer-executable components 91 for causing a RAN node 3 or a radio device 4 to perform an embodiment of a method of the present disclosure when the computer-executable components are run on processor circuitry 71/81 comprised in the RAN node/radio device.

According to another aspect of the present disclosure, there is provided a computer program 91 for establishing an interaction session between an IGW of a RAN and a service client of a radio device for controlling service level communication between the service client and a service provider, wherein there is a first and a second communication bearer between the radio device and a CN via the RAN, where the second communication bearer is associated with the service level communication. The computer program comprises computer program code which is able to, when run on processor circuitry 71 of a RAN node 3, cause the RAN node to obtain S1 an initialization message addressed to the RAN by means of default IGW address information on the first bearer, for initiating the interaction session, the initialization message comprising service level address information used for the service level communication on the service provider side. The code is also able to cause the RAN node to determine S2 dedicated IGW address information for the interaction session. The code is also able to cause the RAN node to initiate S3 sending of a confirmation message comprising the determined dedicated IGW address information to the service client. The code is also able to cause the RAN node to ensure S4 that the interaction session, using the dedicated IGW address information, is associated with the second communication bearer used for the service level communication. The code is also able to cause the RAN node to obtain S5 an interaction session message addressed to the RAN by means of the determined dedicated IGW address information and associated with the service level communication, on the second communication bearer. The code is also able to cause the RAN node to initiate S6 sending a response to the interaction session message, to the service client in the radio device on the second bearer.

According to another aspect of the present disclosure, there is provided a computer program 92 for establishing an interaction session between an IGW of a RAN and service client of a radio device for controlling service level communication between the service client and a service provider, wherein there is a first and a second communication bearer between the radio device and a CN via the RAN, where the second communication bearer is associated with the service level communication. The computer program comprises computer program code which is able to, when run on processor circuitry 81 of the radio device 4, cause the radio device to obtain S11 dedicated IGW address information for the interaction session. The code is also able to cause the radio device to ensure S12 that the interaction session, using the dedicated IGW address information, is associated with the second communication bearer used for the service level communication.

According to another aspect of the present disclosure, there is provided a computer program product 90 comprising an embodiment of a computer program 91/92 of the present disclosure and a computer readable means 93 on which the computer program is stored.

Figure 10:
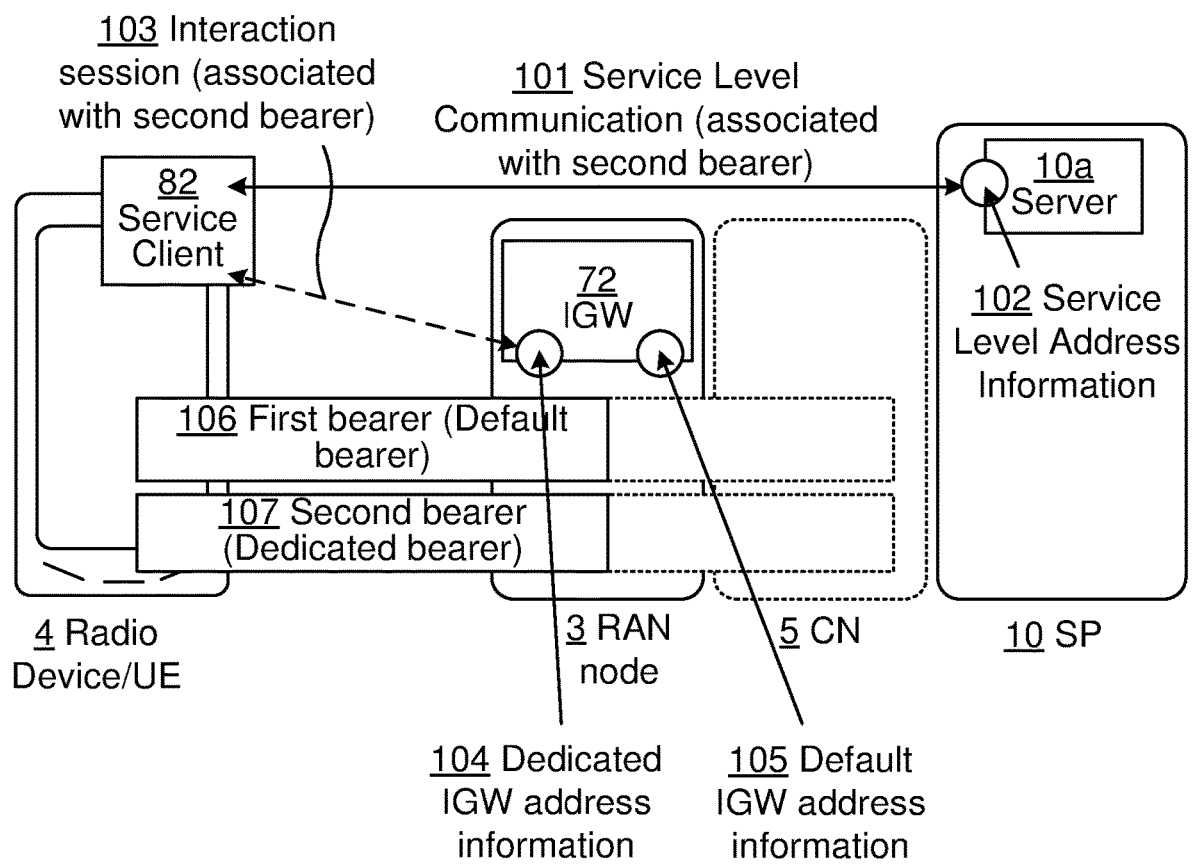
FIG. 10 is a schematic signaling diagram illustrating embodiments of the present disclosure.

FIG. 10 schematically illustrates some signaling between different nodes in accordance with the present disclosure. A first (default) bearer 106 and a second (dedicated) bearer 107 are set up between the radio device 4 and the CN 5 via the RAN node 3. However, since messages relating to the interaction session 103 is addressed to the RAN, by means of the default IGW address information 105 (on the default bearer 106) or the dedicated IGW address information 104 (on the dedicated bearer 107), these messages are picked up by the RAN node 3 instead of being forwarded to the CN on the respective bearer 106 or 107. The service level communication 101 from/to the service client 82 is addressed by means of the service level address information 102, e.g. IP addresses or domain names (Domain Name System, DNS) of one or more server boa of the SP 10. The interaction session 103 from the service client 82 is set up to the IGW 72 by means of the initialization message with the default IGW address information 105 on the default bearer 106. Then, the interaction session uses the dedicated IGW address information 104 on the dedicated bearer 107.

Figure 11:
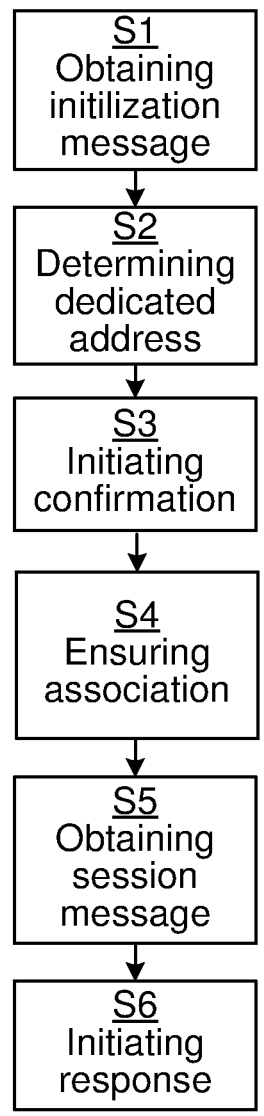
FIG. 11 is a schematic flow chart of an embodiment of a method performed in the RAN in accordance with the present disclosure.

FIG. 11 is a schematic flow chart of an embodiment of the method performed in the RAN 2. The method may be performed in a RAN node 3 e.g. in an RNC or in an eNB of the RAN 2.

An initialization message addressed to the RAN 2 by means of default IGW address information 105 on the first bearer 106 is obtained S1, e.g. by receiving the message directly or indirectly (via another part of the RAN 2) from the radio device 4. The initialization message is for initiating the interaction session 103 between the service client 82 and the IGW 72. The initialization message comprises service level address information 102 used for the service level communication 101 on the service provider side. The service level address information 102 may be used by the RAN 2 to identify the service level communication 101 and the second bearer 107 carrying the service level communication 101. The default IGW address information may e.g. be an (IP) address to the RAN (in general) or to the IGW 72 (in particular).

Then, a dedicated IGW address information 104 for the interaction session 103 is determined S2. The dedicated IGW address information 104 may e.g. be a port number (e.g. UDP port number) to be used for identifying data of the interaction session as it is sent on the second bearer 107.

Then, the RAN initiates S3 sending of a confirmation message comprising the determined S2 dedicated IGW address information 104 to the service client 82 in the radio device 4. That the RAN initiates sending implies that a RAN node 3 sends the confirmation message to the radio device 4, but it need not be the same RAN node 3 that sends the message as determines S2 the dedicated IGW address information 104 and initiates S3 the confirmation message.

The RAN 2 ensures S4 that the interaction session 103, which session uses the dedicated IGW address information 104, is associated with the second communication bearer 107 used for the service level communication 101. This implies that data/messages of the interaction session are transmitted over the second communication bearer 107, which is the same bearer over which the service level communication 101 is transmitted. In some embodiments, the ensuring S4 comprises initiating setting up of a filter (e.g. TFT) in the radio device 4 for mapping Internet Protocol (IP) data packets associated with the determined dedicated IGW address information 104 to the second communication bearer 107, after the determining S2 of the dedicated IGW address information and before the obtaining S5 of the interaction session message. Additionally or alternatively, in some embodiments, the ensuring S4 comprises initiating sending a message comprising the determined S2 dedicated IGW address information 103 as well as the service level address information 102 to an Application Function (AF), for initiating setting up of a filter in the CN 5 for mapping IP data packets associated with the determined dedicated IGW address information 104 to the second communication bearer 107. The AF may e.g. communicate with the PCRF for setting up the filter (e.g. TFT) in the PGW.

As part of the interaction session 103, the RAN obtains S5 an interaction session message addressed to the RAN 2 by means of the determined S2 dedicated IGW address information 104 on the second communication bearer 107. The interaction session message may be obtained e.g. by receiving the message directly or indirectly (via another part of the RAN 2) from the radio device 4. The message comprises the determined S2 dedicated IGW address information 104 (e.g. as destination address/port) whereby the RAN 2 may identify the message as being part of the interaction session and may take the message from the second bearer 107 to the IGW 72.

Also as part of the interaction session 103, the RAN 2 initiates S6 sending of a response to the interaction session message. The response is sent/addressed to the service client 82 in the radio device 4 on the second bearer 107. That the RAN initiates sending implies that a RAN node 3 sends the response message to the radio device 4, but it need not be the same RAN node 3 that sends the message as determines S2 the dedicated IGW address information 104 and initiates S6 the response message.

Figure 12:
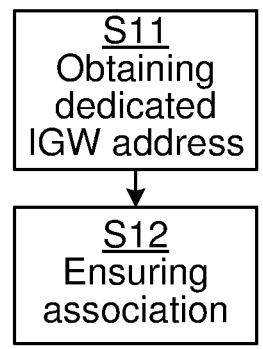
FIG. 12 is a schematic flow chart of an embodiment of a method performed in the radio device in accordance with the present disclosure.

FIG. 12 is a schematic flow chart of an embodiment of the method performed in the radio device 4.

The radio device 4 obtaining S11 dedicated IGW address information 104 for the interaction session 103. The obtaining S11 may e.g. comprise, in conformity with the corresponding method embodiments of FIG. 11, sending an initialization message addressed to the RAN 2 by means of default IGW address information 105 on the first communication bearer 106, for initiating the interaction session 103; and receiving a confirmation message from the RAN 2, the message comprising the dedicated IGW address information 104 for the interaction session. Alternatively, the obtaining S11 may comprise selecting the dedicated IGW address information 104 for the interaction session (i.e. the radio device selects the dedicated IGW address information 104).

Then, the radio device 4 ensures S12 that the interaction session 103, which interaction session uses the dedicated IGW address information 104, is associated with (i.e. is sent on) the second communication bearer 107 used for the service level communication 101. The ensuring S12 may comprise including the service level address information 102 in the initialization message 131 for facilitating the RAN to further provide information e.g. to other network nodes to identify the service level communication 101 and the second bearer 107 on which the service level communication is transmitted. In some embodiments, the ensuring S12 comprises updating a filter (e.g. TFT) for the second communication bearer 107, which bearer is used by the service level communication 101, with the dedicated IGW address information 104, thus e.g. adding a TFT to the second bearer 107 locally at the radio device side. In some embodiments, the ensuring S12 comprises initiating Request Bearer Resource Modification to the CN 5 to update a filter (e.g. TFT) for the second communication bearer 107 with the dedicated IGW address information 104, thus facilitating the CN 5 adding a TFT to the second bearer both at the CN side and at the radio device side.

In some embodiments of the present disclosure, the first communication bearer 106 is a default bearer and the second communication bearer 107 is a dedicated bearer, as exemplified herein.

In some embodiments of the present disclosure, the first and second communication bearers 106 and 107 are EPS bearers or Packed Data Protocol (PDP) contexts, depending on the 3GPP standard of the communication network 1.

In some embodiments of the present disclosure, the filter of the second bearer 107, at the radio device and/or CN side, is a Traffic Flow Template (TFT). However, other types of filter are also contemplated, depending on the 3GPP standard of the communication network 1.

Example 1—Radio Device Side Solution

The first and second embodiments described below assume that there is an API available in the radio device 4 that the client 82 can use to establish a dedicated bearer, i.e. trigger the lower layers in the radio device to signal this to the CN 5, and that this API also provides an identifier for this bearer to the client that can be used in subsequent bearer modifications, e.g. to add TFTs.

In a first embodiment, when the client 82 has received the dedicated IGW address information 104 (e.g. an UDP termination port) the client initiates a TFT to be added to the second bearer 107 by instructing the lower layers (using the above mentioned API) to send the existing standard message 'Request Bearer Resource Modification'. The radio device includes that the dedicated IGW address information (e.g. RAN IP address and/or the selected UDP termination port) should be part of the TFT. In the 'Request Bearer Resource Modification' message the radio device may include the bearer identity for the dedicated bearer 107 and an existing TFT for this bearer or both. Then, if the network 1 accepts the bearer request, the network will send a new UL TFT to the radio device which comprises the RAN IP and/or the UDP termination port. When this TFT is installed at the radio device, messages with the dedicated IGW address information 104 will be sent on the correct (second) bearer 107.

In a second embodiment, the radio device may implement functionality to locally modify the UL TFT filters, i.e. avoid the signaling to the communication network 1. For example, the client 82 that has initiated I1 signaling 103, could send the dedicated IGW address information 104 (e.g. RAN IP and/or selected UDP port)) and the service level address information on an API to the lower layers of the radio device. The lower layers in the radio device 4 use the service level address information 102 to identify a bearer (based on lookup on TFTs for all active dedicated bearers). Once the dedicated bearer 107 for the specific service is identified, the lower layers can have the uplink TFT for the dedicated IGW address information added locally in the radio device 4 for the identified bearer.

In a third embodiment, there exists an interface in the client side for the client 82 to add new traffic flows to dedicated bearers, although the interface may or may not support establishment of dedicated bearers. The client may or may not know that a dedicated bearer 107 exists for a specific service. When the client receives the I1 confirmation message from the RAN 2, the client internal interface may be used as follows. First, the client provides the dedicated IGW address information 104 (e.g. RAN IP and/or selected UDP port) and the service level address information to the lower layers. The lower layers in the radio device 4 use the service level address information 102 to identify a bearer (based on lookup on TFTs for all active dedicated bearers). Once the dedicated bearer 107 for the specific service is identified, the Request Bearer Resource Modification procedure can be triggered in a similar way as for the first embodiment. Finally, the radio device internal interface can be used to indicate to the client 82 the outcome of the lower layer actions.

Example 2—Network Side Solution

Alternatively, the network side can trigger the additional TFT. This is beneficial if the radio device 4 or client 82 does not support this functionality (e.g. the API discussed in Example 1). In this case, the radio device would need to send the service level address information 102 (e.g. destination IP address(es) the service is related to) in the I1 Initialization message to the RAN 2. The RAN would then interact with an Application function (AF) 12, and provide the service level address information 102 and the dedicated IGW address information 104 (e.g. the RAN IP address and/or the selected UDP termination port). The AF 12 would then instruct the PCRF 11 to ensure that a TFT is added comprising the dedicated IGW address information 104 to the bearer 107 identified by the service level address information, and if needed additional parameters that are required to identify the bearer, e.g. used ports, protocols etc. as available for a TFT. The PCRF may ensure this addition of the TFT by signaling the received service level address information 102 and dedicated IGW address information 104 information to the PDN-GW (over the Gx interface). The PGW may then initiate a bearer modification procedure resulting in that the UE also receives the updated UL TFT for the dedicated IGW address information for the bearer associated with the service. Subsequently UL messages addressed to the dedicated IGW address information are sent on the second bearer 107. This is illustrated in FIG. 13.

Figure 13:
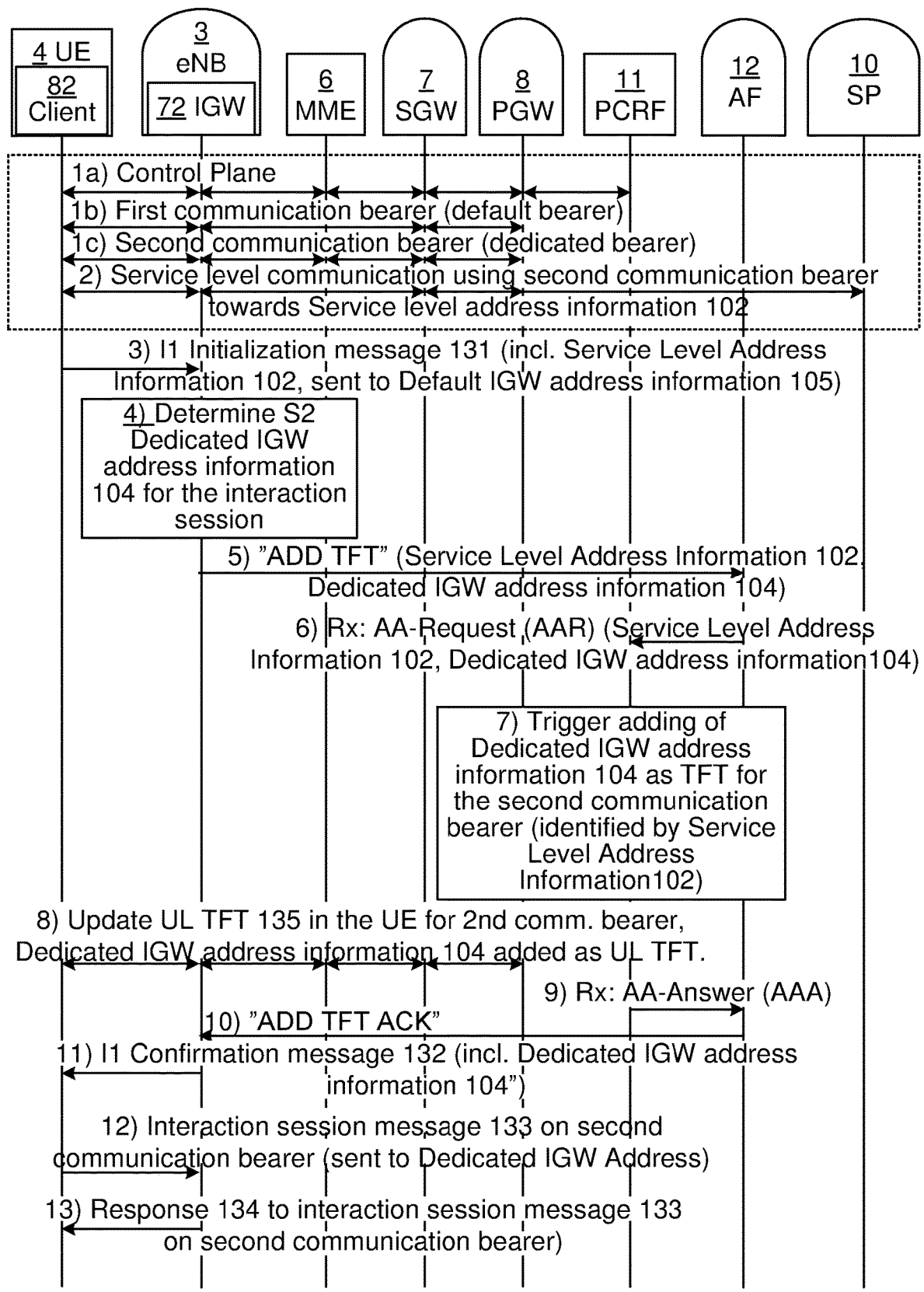
FIG. 13 is a schematic signaling diagram illustrating example embodiments of the present disclosure.

FIG. 13 shows a simplified communication network 1 for LTE. For example the CN nodes used for control plane signaling, such as the MME 6 in case of LTE may be replaced with a Serving GPRS support node (SGSN) in case of Wideband Code Division Multiple Access (WCDMA). The RAN 2 is exemplified with an eNB 3, however could alternatively be an other RAN node, such as an RNC. Also, a functional entity which may act as an AF in this context, using the Rx interface towards the PCRF is shown. Furthermore, the AF is shown as a standalone entity. It could be combined with the RAN 2.

Also, the sequence of messages/signaling is just an example to illustrate embodiments. For instance, step 8 could be performed immediately after step 4, and step 10 is optional, etc. The list numbering below relates to the step numbers in FIG. 13.

1. In the initial situation in which embodiments of the methods of the present disclosure may be used there are two user plane bearers active. A default (first) bearer 106 of step 1b and a dedicated (second) bearer 107 of step 1c. The dedicated bearer is established for a service session to the SP 10. SP 10 may consist of multiple different servers boa each with its own service level address information 102 (e.g. IP-address), for example in the case when the service is available at multiple different servers boa and the radio device 4 selects which of the servers to use based on different criteria. The service level address information 102 may also contain additional information for the CN 5 to be able to identify the correct dedicated bearer for the radio device (such information may consist of for example destination port(s) and/or protocol used). There is also a control plane bearer in step 1a.

2. There is also ongoing service level communication 101 on the second bearer 107, using the service level address information 102.

3. The service client 82 wishes to initiate I1 interaction for the interaction session 103 on the dedicated bearer 107, and sends an I1 initialization message 131 on the first communication bearer (i.e. the default bearer) 106 using the default IGW address information, e.g. a RAN IP address. The RAN 2 looks for messages with default IGW address information 105 (e.g. destination IP address=RAN IP). The client 82 includes the service level address information 102 in the initialisation message. The initialisation message may also include other information, such as type of service, etc.

4. The RAN obtains up the initialisation message and determines S2 a dedicated IGW address information 104 for the interaction session (e.g. an UDP termination port for this session). The RAN may store this information in the UE context, i.e. to ensure uniqueness in case several interaction sessions need to be handled.

5. The RAN 2 signals the need to add a TFT comprising the dedicated IGW address information 104 for interaction session signaling on the dedicated bearer 107. The dedicated bearer for the service in question is identified with the service level address information identifying an existing TFT (or parts of an existing TFT) for the dedicated bearer.

6. In this example the AF entity 12 handles the interaction with the PCRF 11 to ensure the adding of the TFT related to the I1 interaction session to the existing dedicated bearer 107 for the service the I1 interaction session relates to. However, the RAN 2 could alternatively interact with the PCRF 11 directly. This step comprises the AF 12 providing information to the PCRF 11 by means of an AA Request (AAR) over the Rx interface to both identify the radio device 4 in question and to identify the dedicated bearer 107 of the radio device by means of the service level address information identifying an existing TFT. The TFT to add is identified by the dedicated IGW address information 104.

7. The PCRF 11 interacts with the packet core nodes, i.e. the PGW 8 (or GGSN for WCDMA) to initiate adding of the new TFT. This triggers adding of the dedicated IGW address information 104 as TFT for the second communication bearer 107 as identified by means of the service level address information 102.

8. The PGW may then initiate a bearer modification procedure resulting in that the radio device 4 also receives the new UL TFT for the determined S2 dedicated IGW address information 104 for the I1 interaction session 103. This allows the radio device 4 to add the dedicated IGW address information 104 as UL TFT for the second communication bearer associated with the service.

9. An AA Answer (AAA) is sent over the Rx interface in response to the AAR of step 6.

10. The packet core acknowledges the addition of the TFT to the RAN 2. This step may alternatively happen already before step 7. The AF 12 replies to the RAN 2 that the TFT addition has been initiated or that it may have been completed. This step is optional and could be excluded or executed at other point in the sequence.

11. The RAN 2 sends a confirmation message 132 to the radio device 4/client 82, including the determined S2 dedicated IGW address information 104.

12. The client 82 sends an interaction session message with the dedicated IGW address information to the RAN 2/IGW 72. The added uplink TFT will put this message on the second communication bearer (i.e. the dedicated bearer 107).

13. The RAN 2/IGW 72 replies to the interaction session message with a response 134 to the radio device 4/client 82. RAN internal functions will ensure that the message is sent on the correct dedicated bearer 107, e.g. the RAN knows from which bearer it received the message and sends the response on the same bearer.

Below follow some other aspects of the present disclosure.

According to an aspect of the present disclosure, there is provided a method performed in a radio device 4, comprising a service client 82 configured for service level communication 101 with a service provider 10. The radio device is connected to a Radio Access Network (RAN) 2 of a communication network 1 in which there is a first and a second communication bearer 106 and 107 between the radio device and a core network (CN) 5 of the communication network 1 via the RAN. The second communication bearer 107 is associated with the service level communication. The method is for establishing an interaction session 103 between an Interaction Gateway (IGW) 72 of the RAN and the service client in the radio device for controlling the service level communication. The method comprises sending an initialization message 131 addressed to the RAN 2 on the first bearer 106, for initiating the interaction session 103, the initialization message comprising default IGW address information 105, and service level address information 102 used for the service level communication 101 on the service provider side. The method also comprises receiving a confirmation message 132 comprising dedicated IGW address information 104, from the RAN 2. The method also comprises obtaining a filter 135 for mapping Internet Protocol (IP) data packets associated with the dedicated IGW address information 104 to the second bearer 107. The method also comprises mapping an interaction session message 133 comprising the dedicated IGW address information 104 on the second communication bearer 107 by means of the filter 135. The method also comprises sending the interaction session message 133 associated with the service level communication 101 to the RAN 2 on the second communication bearer 107. The method also comprises receiving a response 134 to the interaction session message 133, from the RAN 2 on the second communication bearer 107 associated with the service level communication 101, the response comprising the dedicated IGW address information 104.

According to another aspect of the present disclosure, there is provided a RAN node 3 suitable for a RAN 2 of a communication network 1 used by a service client 82 for service level communication 101 with a service provider 10, in which communication network there is a first and a second communication bearer 106 and 107 between a radio device 4 and a CN 5 of the communication network via the RAN, where the second communication bearer 107 is associated with the service level communication, and suitable for establishing an interaction session 103 between an IGW 72 and the service client on the second communication bearer for controlling the service level communication. The RAN node comprises means (e.g. the receiving module m) for obtaining S1 an initialization message 131 addressed to the RAN 2 by means of default IGW address information 105 on the first bearer 106, for initiating the interaction session 103, the initialization message comprising service level address information 102 used for the service level communication 101 on the service provider side. The RAN node also comprises means (e.g. a determining module 76) for determining S2 dedicated IGW address information 104 for the interaction session 103. The RAN node also comprises means (e.g. the sending module 77) for initiating S3 sending of a confirmation message 132 comprising the determined S2 dedicated IGW address information 104 to the service client 82. The RAN node also comprises means (e.g. the ensuring module 78) for ensuring S4 that the interaction session 103, using the dedicated IGW address information 104, is associated with the second communication bearer 107 used for the service level communication 101. The RAN node also comprises means (e.g. the receiving module 75) for obtaining S5 an interaction session message 133 addressed to the RAN 2 by means of the determined S2 dedicated IGW address information 104 on the second communication bearer 107. The RAN node also comprises means (e.g. the sending module 77) for initiating S6 sending a response 134 to the interaction session message 133, to the service client 82 in the radio device 4 on the second bearer 107.

According to another aspect of the present disclosure, there is provided a radio device 4 suitable for being connected to a RAN 2 of a communication network 1 in which there is a first and a second communication bearer 106 and 107 between the radio device and a CN 5 of the communication network via the RAN, where the second communication bearer 107 is associated with the service level communication, and suitable for establishing an interaction session 103 between an IGW 72 of the RAN and the service client in the radio device on the second communication bearer for controlling the service level communication. The radio device comprises means (e.g. the obtaining module 85) for obtaining S11 dedicated IGW address information 104 for the interaction session 103. The radio device also comprises means (e.g. the ensuring module 86) for ensuring S12 that the interaction session 103, using the dedicated IGW address information 104, is associated with the second communication bearer 107 used for the service level communication 101.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a Radio Access Network (RAN) of a communication network used by a service client for service level communication with a service provider, the communication network including a first communication bearer and a second communication bearer between a radio device, comprising the service client, and a core network (CN) of the communication network via the RAN, where the second communication bearer is associated with the service level communication, for establishing an interaction session on the second communication bearer between an Interaction Gateway (IGW) of the RAN and the service client for controlling the service level communication, the method comprising:

obtaining an initialization message addressed to the RAN with default IGW address information on the first communication bearer, for initiating the interaction session, the initialization message comprising service level address information used for the service level communication by the service provider;

determining dedicated IGW address information for the interaction session;

initiating sending of a confirmation message comprising the determined dedicated IGW address information to the service client;

associating the interaction session, using the dedicated IGW address information, with the second communication bearer used for the service level communication;

obtaining an interaction session message addressed to the RAN with the determined dedicated IGW address information on the second communication bearer; and initiating sending a response to the interaction session message, to the service client in the radio device on the second communication bearer.

2. The method of claim 1, wherein the associating comprises initiating setting up of a filter in the radio device for mapping Internet Protocol (IP) data packets associated with the determined dedicated IGW address information to the second communication bearer, after the determining of the dedicated IGW address information and before the obtaining of the interaction session message.

3. The method of claim 2, wherein the filter is a Traffic Flow Template (TFT).

4. The method of claim 1, wherein the associating comprises initiating sending a message comprising the determined dedicated IGW address information as well as the service level address information to an Application Function, for initiating setting up of a filter in the CN for mapping IP data packets associated with the determined dedicated IGW address information to the second communication bearer.

5. The method of claim 1, wherein the first communication bearer is a default bearer and the second communication bearer is a dedicated bearer.

6. The method of claim 1, wherein the first communication bearer and the second communication bearer are Evolved Packet System (EPS) bearers or Packed Data Protocol (PDP) contexts.

7. The method of claim 1, wherein the method is performed in a Radio Network Controller or in an evolved Node B (eNB) of the RAN.

8. A RAN node for a Radio Access Network (RAN) of a communication network used by a service client for service level communication with a service provider, the communication network including a first communication bearer and a second communication bearer between a radio device and a core network (CN) of the communication network via the RAN, where the second communication bearer is associated with the service level communication, for establishing an interaction session between an Interaction Gateway (IGW) and the service client on the second communication bearer for controlling the service level communication, the RAN node comprising:
the IGW;
processor circuitry; and
storage storing instructions executable by said processor circuitry whereby said RAN node is operative to:
obtain an initialization message addressed to the RAN with default IGW address information on the first communication bearer, for initiating the interaction session, the initialization message comprising service level address information used for the service level communication by the service provider;
determine dedicated IGW address information for the interaction session;
initiate sending of a confirmation message comprising the determined dedicated IGW address information to the service client;
associate the interaction session, using the dedicated IGW address information, with the second communication bearer used for the service level communication;
obtain an interaction session message addressed to the RAN with the determined dedicated IGW address information on the second communication bearer; and
initiate sending a response to the interaction session message, to the service client in the radio device on the second communication bearer.

9. A method performed in a radio device, comprising a service client configured for service level communication with a service provider, connected to a Radio Access Network (RAN) of a communication network in which there is a first communication bearer and a second communication bearer between the radio device and a core network (CN) of the communication network via the RAN, where the second communication bearer is associated with the service level communication, for establishing an interaction session between an Interaction Gateway (IGW) of the RAN and the service client in the radio device on the second communication bearer for controlling the service level communication, the method comprising:
obtaining dedicated IGW address information for the interaction session, wherein the obtaining comprises:
sending an initialization message addressed to the RAN with default IGW address information on the first communication bearer, for initiating the interaction session; and
receiving a confirmation message from the RAN, comprising the dedicated IGW address information for the interaction session; and
associating the interaction session, using the dedicated IGW address information, with the second communication bearer used for the service level communication.

10. The method of claim 9, wherein the associating comprises including service level address information in the initialization message.

11. A radio device for being connected to a Radio Access Network (RAN) of a communication network in which there is a first communication bearer and a second communication bearer between the radio device and a core network (CN) of the communication network via the RAN, where the second communication bearer is associated with service level communication, and for establishing an interaction session between an Interaction Gateway (IGW) of the RAN and a service client in the radio device on the second communication bearer for controlling the service level communication, the radio device comprising:
the service client configured for controlling the service level communication with a service provider;
processor circuitry; and
storage storing instructions executable by said processor circuitry whereby said radio device is operative to:
obtain dedicated IGW address information for the interaction session, wherein the obtaining comprises:
sending an initialization message addressed to the RAN with default IGW address information on the first communication bearer, for initiating the interaction session; and
receiving a confirmation message from the RAN, comprising the dedicated IGW address information for the interaction session; and
associate the interaction session, using the dedicated IGW address information, with the second communication bearer used for the service level communication.

12. The method of claim 9, wherein the obtaining further comprises selecting the dedicated IGW address information for the interaction session.

13. The method of claim 9, wherein the associating comprises updating a filter for the second communication bearer used by the service level communication with the dedicated IGW address information.

14. The method of claim 9, wherein the associating comprises initiating Request Bearer Resource Modification to the CN to update a filter for the second communication bearer used by the service level communication with the dedicated IGW address information.

* * * * *